Figure 1:
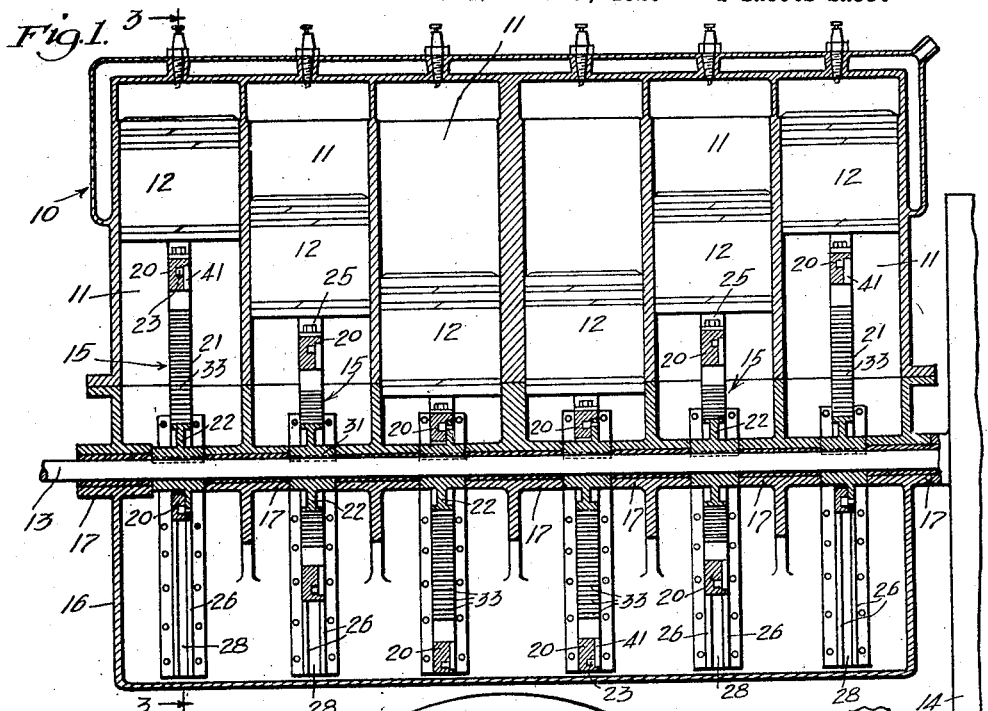

April 15, 1924.

O. E. KELLUM 1,490,611

ENGINE

Filed Dec. 3, 1920   2 Sheets-Sheet 1

Inventor:
Orlando E. Kellum

By *James T. Barlow* his Attorney

April 15, 1924.
O. E. KELLUM
ENGINE
Filed Dec. 3, 1920  2 Sheets-Sheet 2
1,490,611
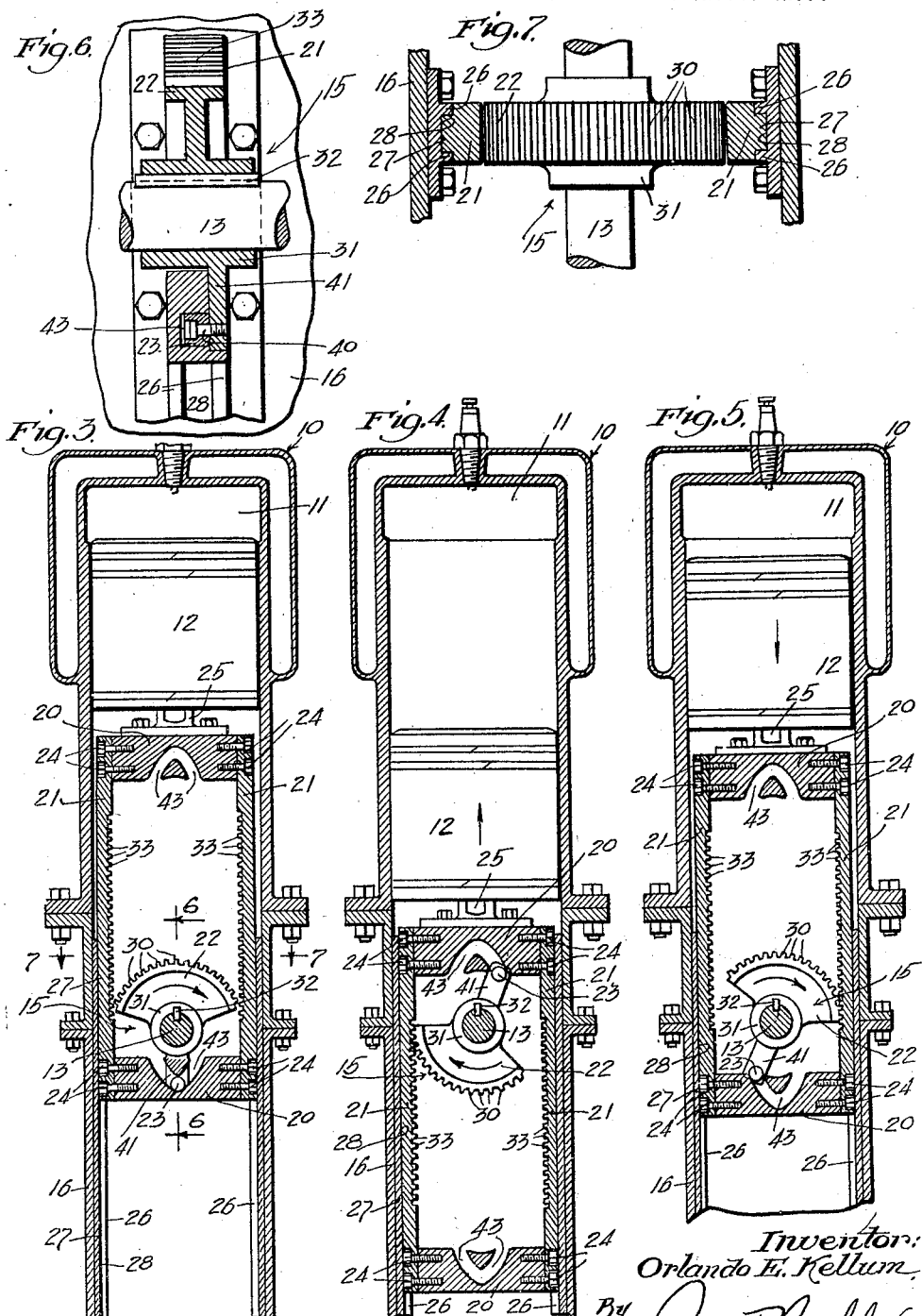

Patented Apr. 15, 1924.

1,490,611

UNITED STATES PATENT OFFICE.

ORLANDO E. KELLUM, OF LOS ANGELES, CALIFORNIA.

ENGINE.

Application filed December 3, 1920. Serial No. 428,032.

*To all whom it may concern:*

Be it known that I, ORLANDO E. KELLUM, citizen of the United States, residing at Los Angeles, in the county of Los Angeles, State of California, have invented certain new and useful Improvements in Engines, of which the following is a specification.

This invention has to do with improvements in engines or other mechanisms wherein reciprocatory motion is converted into rotary motion, or wherein rotary motion is converted into reciprocatory motion, and an object of the invention is to provide a simple, effective device or arrangement for such engines or mechanisms whereby the different motions are converted one into the other.

In its broader aspect my invention relates to a mechanism for interchanging reciprocatory and rotary motions and is applicable for use in any form or character of mechanism or apparatus. In this particular disclosure I am referring to the invention as being applied to engines such, for instance, as reciprocating steam engines or reciprocating internal combustion engines, as it is particularly well adapted for use in this general class of machinery, and because such engines or mechanisms may be considered, or in fact, are, typical well known mechanisms wherein rotary and reciprocatory motions are interchanged. The reciprocating internal combustion engine particularly presents a large field in which the present invention may be used to advantage. However, it is to be understood that the invention is not limited to use or embodiment in any particular or specific form of mechanism, but that it is applicable to substantially any class or character of mechanical devices.

A noteworthy feature of the invention is the provision of a mechanism for converting rotary and reciprocatory motion in which there is a constant leverage or mechanical advantage between the rotating and reciprocating parts. This overcomes any disadvantages and losses incident to crank mechanism, and the like, where the leverage is constantly changing. With the present invention embodied in an internal combustion engine of the ordinary type, the force of each explosion is communicated to the rotating shaft with the same leverage as the force of the following gas expansion. In this way the available power is efficiently utilized.

The mechanism provided by the invention comprises a toothed segment mounted on the rotating member, two racks mounted on a reciprocating member, and means for positively guiding or shifting the toothed segment between the rack so that it engages or meshes with one of the racks during the motion of the racks in one direction and engages or meshes with the other rack during the motion of the racks in the other direction. The positive means for guiding and shifting the toothed segments assures proper meshing of the segment and the racks, makes for noiseless operation, prevents injury of the teeth on the segment or racks, etc. These points are of particular importance in that they make the device of the present invention practical and of commercial value.

The various objects and features of this invention will be best and more fully understood from the following detailed description of typical forms of the invention throughout which reference is had to the accompanying drawings in which—

Figure 2:
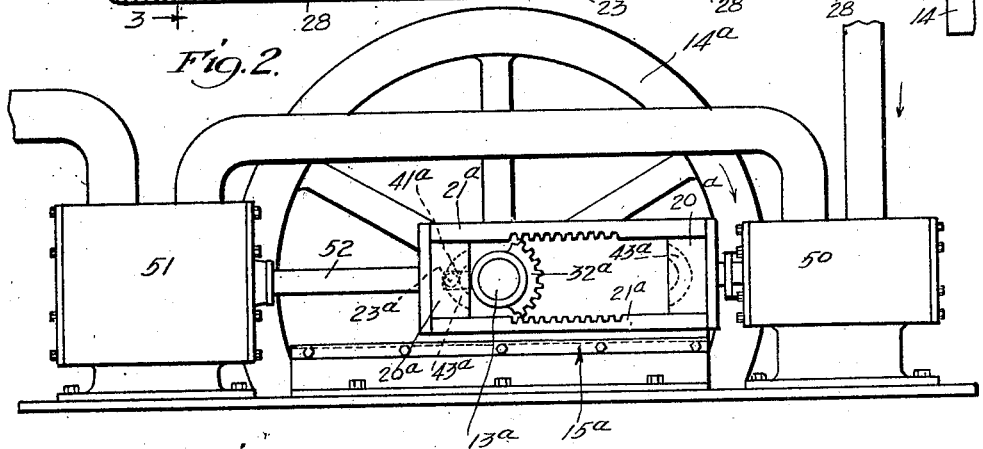
Figure 3:
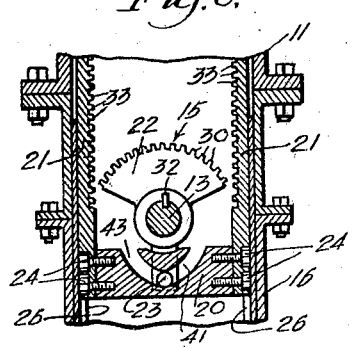

Fig. 1 is a vertical view through a typical reciprocating multi-cylinder internal combustion engine embodying the present invention: Fig. 2 is a side elevation of a typical compound steam engine embodying the present invention; Fig. 3 is a sectional view of the internal combustion engine, being a view taken as indicated by line 3—3 on Fig. 1; Fig. 4 is a sectional view similar to Fig. 3, showing the mechanism in position immediately after the piston has passed its bottom dead center; Fig. 5 is a sectional view similar to Fig. 3, showing the mechanism in position immediately after the piston has passed its upper dead center; Fig. 6 is an enlarged detail sectional view taken as indicated by line 6—6 on Fig. 3; Fig. 7 is an enlarged detail sectional view similar to a portion of Fig. 3, showing a somewhat different form of the invention than that shown in the other figures of the drawing. Fig. 8 is a view similar to Fig. 3 showing a cam groove of more gradual curvature.

Referring now to the drawings and particularly to Figs. 1, 3, 4, 5, 6 and 7 of the drawings, numeral 10 designates a typical multi-cylinder reciprocating internal combustion engine comprising a plurality of cylinders 11, single-acting pistons 12 in the cylinder 11, a driven shaft 13, a fly-wheel 14 mounted on the shaft 13, and mechanisms 15, made in accordance with the present invention, connecting each of the pistons 12 with the driven shaft so that the shaft 13 will be continuously rotated in one direction upon reciprocatory movement of the pistons 15 in the cylinders 11. The mechanisms 15 and the shaft 13 may be carried or supported in a suitable casing or frame structure 16, which may be substantially the same as that part termed the crank case in the ordinary type of reciprocating engines. The casing 16 may be provided with suitable bearings 17 to carry the shaft 13 and may guide parts of the mechanisms 15 as will be hereinafter described. For sake of illustration I have shown a multi-cylinder engine and have shown the pistons timed, or relatively positioned, in a typical manner. It will be understood, of course, that the invention might well be embodied in single cylinder engine and that the piston may be timed or relatively positioned in any desired manner when it is embodied in a multi-cylinder engine.

The several mechanisms 15 connecting the pistons 12 and shaft 13 are identical in construction and operation. So, therefore, I will proceed to describe in detail only one of said mechanisms, it being understood, of course, that such description is applicable to all of said mechanisms.

The mechanism 15 comprises, generally, two cam members 20 and two straight rack members 21 fixed or permanently secured to the piston 12, and a toothed segment 22 and a cam follower 23 fixed or secured to the shaft 13. The cam members 20 are connected between the ends of the rack members 21 which are arranged to face inwardly toward each other, as clearly shown in the drawings. The cam members, being arranged at the ends of the rack members, are in spaced relation, while the rack members, in being connected to opposite sides of the cam members, are also held in spaced relation. The cam members are of exactly the same size and the rack members are of exactly the same length and size, thereby causing the structure formed by the cam member and rack members to be rectangular, as shown in the drawings. In practice the connections between the rack members and cam members may be effected by bolts 24, as shown in the drawings. The frame or structure formed by the rack members and cam members is rigidly and permanently connected to the piston 12 by a connecting member 25 and is supported or slidably carried in guides 26 mounted in the casing 16. In practice, longitudinal projections or ribs 27 may be formed on the outer or back sides of the rack member 21 and the guide member 26 may be formed with grooves 28 to slidably carry the ribs 27. It will be understood, of course, that the guides 26 are arranged parallel with the longitudinal axis of the cylinder so that the piston 12 and structure formed by the cam members 20 and rack members 21 will be free to reciprocate. From inspection of the drawings it will be noted that the guides 26 are mounted in the casing 16 so as to be equally spaced on either side of the shaft 13, thereby causing the two rack members to be equally spaced from, or on either side of, the shaft 13, and to face inwardly toward the shaft 13. Further, it will be noted that the various parts are arranged and proportioned so that the two cam members 20 are on opposite sides of the shaft 13, or, in other words, so that the shaft 13 is within, or extends through, the structure formed by the cam members 20 on the racks 21.

The toothed segment 22, which is fixed or mounted on the shaft 13, is a member curved concentrically with the shaft 13 and formed at its periphery with teeth 30. The segment is formed with a hub 31 secured to the shaft 13 by a key 32 and is positioned longitudinally on the shaft 13, so that the toothed portion is opposite, or in alignment with, the rack members 21. The radius on which the teeth 30 are formed is such that the teeth 30 will engage and properly mesh with the teeth 33 of either of the rack members 21 upon proper positioning of the parts. It will be understood, of course, how the segment will properly and accurately cooperate with either of the rack members 21 because of the fact that the rack members are equally spaced from the shaft 13. From inspection of the drawings, and particularly Figs. 3 and 7 of the drawings, it will be noted that the toothed segments 32 extend through slightly less than 180° and sufficiently less than 180° to permit of its being positioned so that it does not engage either of the rack members 21.

The cam follower 23 may be in the form of a roller mounted on a pin 40 extending from an arm 41 which projects from the hub 31 of the toothed segment. The arm 41 is disposed diametrically opposite the toothed segment 32 and is of such length that it can be moved to any position without engaging the rack members 21. The pin 40 which carries the cam following roller, is mounted on the extreme outer end of the arm 41, and is disposed so that its longitudinal axis is parallel with that of the shaft 13.

The cam members 20 are like but opposite, each having a cam groove 43 of such size as to accurately receive and carry the cam follower 23. The cam grooves 43 are more or less V-shaped with their open ends facing inwardly or toward the shaft 13, and are preferably symmetrical or even. From inspection of the drawings it will be seen that each cam groove is shaped so that the structure formed of the cam members and rack members will be moved in one direction when the cam follower is moved through one side of it and will be moved in the opposite direction after passing the bottom or innermost portion of it and being moved through the other side. The various parts of the device are arranged and proportioned so that the cam follower enters one of the cam grooves 43 as the toothed segment closely approaches a position where it will be out of engagement with both rack members and so that the cam follower will be well in the cam groove by the time the toothed segment is clear of the rack members, thus allowing the cam follower to reverse the direction of motion of the structure formed of the cam members and rack members by passage through the bottom or lowermost position of the cam groove, and thereby cause the structure to be moving in the proper direction when the toothed segment again moves into engagement with one of the rack members. In other words, the cam members 20 are so spaced and arranged and the cam grooves in them are of such shape and arrangement that the structure formed by the cam members and rack members is reversed in its direction of motion between the time the toothed segment passes out of engagement with one of the rack members and the time it enters engagement with the other rack member. It is needless to say, of course, that rotation of the toothed segment in one direction, with proper changing of direction of the structure formed of the cam members and rack members, will cause the toothed segment to engage and mesh with one of the racks and then the other and thereby cause said structure to have reciprocatory movement. It will also be understood that it is not necessary that the shaft 13 be the driving member nor is it necessary that the structure formed of the cam members and rack member be the driving member. In the particular case under consideration the mechanism may be said to start its cycle of operation from the position shown in Fig. 3 of the drawings. In this position the piston 12 is at the uppermost end of its stroke and the structure formed by the cam members and rack members, and the toothed segment are relatively positioned so that the toothed segment is in engagement with neither of the rack members and so that the cam follower is at the bottom or lowermost portion of the cam groove of the lowermost cam member. From the position just described the shaft and toothed segment are rotated in the direction indicated by the arrow in Fig. 3 by momentum, say, for instance, of the fly-wheel 14, thereby causing the cam follower 23 to move through the cam groove and start the structure formed of the cam members and rack members moving in a downward direction. Upon the structure being started in a downward direction, the toothed segment meshes with the teeth 33 of the rack to the right in Fig. 2 of the drawing, at which time the explosion takes place in the cylinder 11 above the piston 12 forcing the cam and ratchet structure downwardly and thereby forcing the toothed segment and shaft 13 around in the direction indicated by the arrow in the drawings. When the piston 12 approaches closely the lower end of its stroke, the cam follower 23 enters the cam groove 43 in the uppermost cam member 20, so that it is well in the groove when the toothed segment moves out of engagement with the rack 21 at the right in Fig. 3. Immediately upon the toothed segment leaving the rack at the right the cam follower enters and passes through the bottom or innermost portion of the cam groove, and thereby causes reversal in the direction of motion of the cam and rack members. The cam follower 23 is moved through the bottom or innermost portion of the groove 43 by momentum in the same manner that it was moved through the cam groove in the lowermost cam member. As soon as the cam and rack members are reversed in their direction, or started in an upward direction, the toothed segment rotates into engagement with the rack at the left in Fig. 3. In the case of an internal combustion engine of the ordinary type, the piston and structure formed of the cam and rack members are moved upwardly by momentum of the various parts and by the action of other cylinders. In Fig. 4 of the drawings the mechanism is shown just after the piston has passed its bottom dead center and with the toothed segment just meshed with the left-hand rack. In Fig. 5 of the drawings the mechanism is shown in a position such as it is in immediately after the piston has passed its top dead center or where the toothed segment has just meshed with the right-hand rack.

It will be readily understood how the cam members and racks are positively and accurately reversed in their direction by the co-operation of the cams and cam follower, and how a definite relative positioning is at all times maintained between the toothed segment, the cam members, and the cam follower will accurately enter the cam grooves and so that the teeth 30 of the toothed segment will accurately and properly mesh with the teeth 33 of the racks. With proper design and construction the mechanism will operate smoothly and practically noiselessly. It will be understood how the speed at which the direction of motion of the cam and rack members is changed at either end of the the stroke, is dependent upon the time during which the toothed segment is passing between the racks. In other words, if the toothed segment is of such size that it passes from one rack to the other comparatively quickly, it is necessary that the cam grooves 43 be comparatively sharp or abrupt so that the direction of motion of the cam members and rack members will be reversed quickly. On the other hand if the toothed segment is comparatively small or extends through considerably less than 180° and is therefore out of engagement with the rack members for a considerable length of time for each end of the stroke, the cam grooves can be of easy curvature so that the change in direction of motion of the cam and rack members will be more or less slow or gradual. Such a proportioning and shaping of parts as this is illustrated in Fig. 8 of the drawings. In practice, it is preferred that the parts be shaped and proportioned so that the cam and rack members will be reversed in direction at reasonable rapidity and so that the toothed segment will be out of engagement with the rack members only a reasonable length of time.

In Fig. 2 of the drawings I show the mechanism 15ᵃ provided by the present invention arranged in connection with a compound steam engine. In this particular case the mechanism 15ᵃ is arranged between the high and low pressure cylinders 50 and 51, respectively, so that the structure formed by the cam members 20ᵃ, and the rack members 21ᵃ is directly connected to the piston rods 52. The toothed segment 32ᵃ is mounted on the driven shaft 13ᵃ which carries a fly-wheel 14ᵃ. A cam follower 23ᵃ is carried by an arm 41ᵃ to cooperate with the cam groove 43ᵃ in the cam members 20ᵃ. The operation of this mechanism is the same as the one first described except that the cam and rack members are positively moved in both directions by the engine mechanisms, rather than being moved in one direction by the engine mechanism and in the other direction by momentum, as in the case first described. It will be noted from inspection of the drawing that the mechanism 15ᵃ is designed and proportioned so that the cam grooves 43ᵃ are not abrupt, thereby causing the cam and rack members to be reversed comparatively slowly at the ends of their stroke.

Having set forth only a preferred embodiment of my invention, I do not wish to limit myself to the particular details hereinabove set forth, but wish to reserve to myself any changes or variations that may appear to those skilled in the art or that may fall within the scope of the following claims.

I claim—

1. In mechanism for interchanging rotary and reciprocatory motions, a rotating toothed segment of less that 180° in extent, a structure around the segment, means for supporting the structure to allow it reciprocatory motion, said structure comprising two parallel inwardly facing toothed racks equally spaced on opposite sides of the segment and each adapted to be engaged by the segment during a different portion of each revolution of the segment and a double walled cam groove at each end of the structure facing the segment and at opposite sides of the segment, an arm extending from the segment in a direction diametrically opposite to that in which the segment extends, and a cam follower mounted on the arm to enter and cooperate with the cam grooves to positively reverse the direction of motion of said structure at predetermined points and to hold the reciprocating structure in tooth registering relation to the segment.

2. In mechanism for interchanging rotary and reciprocating motions, a rotating toothed segment of less than 180° in extent, a reciprocating structure around the segment comprising two parallel inwardly facing toothed racks each adapted to be engaged by the segment during different halves of each segment revolution, and comprising a curved double walled cam groove at each end of the structure, said groove having an immediate return bend, and a cam follower connected and rotating with the segment and adapted to enter and cooperate with the cam grooves to positively and immediately reverse the direction of motion of the reciprocating structure and maintain the structure in definite relation to the segment at all times when the follower is in the groove.

3. In mechanism for interchanging rotary and reciprocatory motion, a rotating toothed segment, a reciprocating member having two opposing toothed racks one adapted to mesh with the segment during motion in one direction and the other to mesh with the segment during motion in the opposite direction, and the segment teeth being entirely out of engagement with the rack teeth at the points of reversal of rack motion, and a single co-operating means of two interengaging elements on the segment and member to positively reverse the member motion at each point of reversal and to hold the reciprocating member in tooth registering relation to the segment.

In witness that I claim the foregoing I have hereunto subscribed my name.

ORLANDO E. KELLUM.